United States Patent
vom Dorp et al.

(10) Patent No.: US 9,337,467 B2
(45) Date of Patent: May 10, 2016

(54) ELECTRICAL BYPASS ELEMENT, IN PARTICULAR FOR STORAGE CELLS OF AN ENERGY STORAGE DEVICE

(71) Applicant: Fraunhofer-Gesellschaft zur Foerderung der angewandten Forschung e.V., Munich (DE)

(72) Inventors: Joachim vom Dorp, Erlangen (DE); Tobias Erlbacher, Poxdorf (DE); Lothar Frey, Hoechstadt/Aisch (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 400 days.

(21) Appl. No.: 13/849,832

(22) Filed: Mar. 25, 2013

(65) Prior Publication Data
US 2013/0252039 A1    Sep. 26, 2013

(30) Foreign Application Priority Data

Mar. 23, 2012   (DE) .......................... 10 2012 005 979

(51) Int. Cl.
  *H01M 2/34*    (2006.01)
  *H02H 7/16*    (2006.01)
  *H01M 10/42*   (2006.01)
  *H01M 10/48*   (2006.01)
  *H01G 11/18*   (2013.01)

(52) U.S. Cl.
  CPC ............ *H01M 2/34* (2013.01); *H01M 10/4207* (2013.01); *H01M 10/482* (2013.01); *H02H 7/16* (2013.01); *H01G 11/18* (2013.01); *Y02T 10/7022* (2013.01)

(58) Field of Classification Search
  CPC . H01M 2/34; H01M 10/4207; H01M 10/482; H02H 7/16
  USPC ................................................ 429/61; 361/15
  See application file for complete search history.

(56) References Cited

U.S. PATENT DOCUMENTS 4,849,806 A * 7/1989 Kahlen et al. ................. 257/762

FOREIGN PATENT DOCUMENTS

| DE | 3426199 A1 | 1/1986 |
| DE | 3721754 A1 | 1/1989 |
| DE | 69503932 T2 | 3/1999 |
| WO | WO01/83182 A1 | 11/2001 |
| WO | WO 0183182 A1 * | 11/2001 |

OTHER PUBLICATIONS

Office Action in German Application 102012005979.5 with English Translation.

* cited by examiner

*Primary Examiner* — Karie O'Neill Apicella
(74) *Attorney, Agent, or Firm* — FisherBroyles, LLP; Robert Kinberg

(57) ABSTRACT

An electrical bypass element, suitable for bypassing defective storage cells in energy storage devices includes two electrical conductors between which is formed a layer sequence with at least one electrical insulation layer and one or more reactive layer stacks, in which an exothermic reaction can be triggered. The reactive layer stacks and the insulation layer are matched to one another such that the insulation layer disintegrates as a result of the thermal energy released during the exothermic reaction and an electrical connection is produced between the electrical conductors. The electrical bypass element can be actively triggered even before the ultimate failure of a storage cell so that higher power losses in the energy storage device can be avoided.

10 Claims, 4 Drawing Sheets

ELECTRICAL BYPASS ELEMENT, IN PARTICULAR FOR STORAGE CELLS OF AN ENERGY STORAGE DEVICE

CROSS-REFERENCE TO RELATED APPLICATION

This application claims the priority of German Patent Application No. 10 2012 005 979.0, filed on Mar. 23, 2012, which is incorporated herein by reference in its entirety.

TECHNICAL FIELD

The present invention relates to an electrical bypass element, which is suitable in particular for bypassing defective storage cells of an energy storage device. The invention also relates to an energy storage device having a plurality of storage cells connected in series, in which an electrical bypass element is connected in parallel to each of the storage cells.

Electrical energy storage devices are key components for hybrid vehicles, fuel cell vehicles and electric vehicles. In particular, modern high-power energy storage devices, which consist of lithium-ion accumulator cells connected in series and in parallel, place very high demands in terms of safety and reliability on the electrical and thermal operating conditions of each individual accumulator cell. If just one individual accumulator cell is defective, this may lead to damage or to the failure of the entire energy storage device without provision of suitable measures.

A defective lithium-ion accumulator cell has a high series resistance in the circuit and therefore increases the power loss n the overall system. If this series resistance rises too sharply, a considerable amount of energy will be consumed as power loss in the defective accumulator cell. Specifically, this may cause the entire high-power energy storage device to overheat or catch fire, and even to explode in the worst case scenario. To overcome this problem, which is relevant from a safety aspect, the defective accumulator cell has to be separated from the cell matrix, where possible without interrupting the circuit in the overall system. This separation can be achieved by bypassing the defective storage cell by means of an electrical bypass element, by means of which the two poles of the storage cell are short-circuited.

PRIOR ART

A bypass element for protecting battery cells is known from DE 37 21 754 and enables irreversible bypassing of destroyed storage cells that have failed with high impedance. The bypass element consists of two semiconductor components arranged in series in layers and each having a different current/voltage characteristic. When a destroyed storage cell fails with high impedance, the high charging current flows through the two semiconductor components, which break down due to the resultant sharp increase in temperature and thus irreversibly short circuit the storage cell with low impedance.

A passive bypass element of this type is only triggered however when the accumulator cell is already highly degraded. Premature triggering, for example to prevent high power losses, is not possible.

An object of the present invention is to specify an electrical bypass element that is suitable for bypassing faulty storage cells of an energy storage device and, as required, allows bypassing even before the failure of a storage cell.

SUMMARY OF THE INVENTION

An embodiment of the invention provides an electrical bypass element comprising of two electrical conductors, between which a layer sequence with at least one electrical insulation layer and one or more reactive layer stacks is formed, in which an exothermic reaction can be triggered. The electrical insulation layer in this layer sequence insulates the two electrical conductors electrically with respect to one another. The one or more reactive layer stacks and the at least one insulation layer are matched to one another or designed or dimensioned such that the insulation layer disintegrates as a result of the thermal energy released by the reactive layer stack(s) during the exothermic reaction and an electrical connection is produced between the electrical conductors. The disintegration of the insulation layer is understood here to mean that the insulation layer is no longer present once the exothermic reaction has taken place or is at least degraded to such an extent that it no longer has an electrically insulating effect between the two electrical conductors. The insulation layer may burn or evaporate for example as a result of the released thermal energy. The insulation layer may also merely melt as a result of the released thermal energy and may either be displaced from the region between the electrical conductors due to an applied mechanical pressure or may mix with an electrically conductive material of an adjacent layer in the layer sequence, for example an additional layer made of a solder material.

The reactive layer stacks used in the method are composed of a large number of nanolayers, that is to say layers having layer thickness in the nanometer range, for example in the range from 1 nm to 500 nm, wherein layers formed from two different materials generally alternate and react exothermically with one another as a result of a suitable energy input. Layer stacks of this type are also known under the term "reactive nanofoils" and for example are described in greater detail in WO 01/83182 A1. These reactive layer stacks or nanofoils are used for example in order to solder two components to one another.

With the proposed active electrical bypass element, one or more of these reactive layer stacks are used in order to disintegrate the electrical insulation layer and to produce an electrical connection between the electrical conductors. Since the bypass element in this case is an active electrical bypass element, the bypassing of a storage cell can also be triggered even before complete failure of the storage cell in an energy storage device with suitable monitoring. High power losses in energy storage devices can thus be avoided.

The proposed electrical bypass element may be used for the electrical bypassing of storage cells in energy storage devices or accumulators, such as the aforementioned lithium-ion accumulators, but of course can also be used for other applications in which an irreversible electrical bypass or electrical connection is to be selectively triggered or produced.

In one embodiment of the proposed bypass element, the layer sequence has a layer, at one or both electrical conductors, made of a solderable material that melts, at least in part, as a result of the thermal energy released by the reactive layer stack(s) arranged in the layer sequence in order to form a soldered connection. A solder material of this type has the advantage that, the material of an insulation layer adjoining the solder layer can easily disintegrate in the solder, the insulation layer thus disappearing.

Further layers may also be provided in the layer sequence, for example a further electrical insulation layer or a plurality of reactive layer stacks. Furthermore, it is also possible to insert other layers, such as adhesive layers, into the layer sequence, provided these do not prevent the electrical contact between the two electrical conductors once the exothermic reaction has been triggered.

In an embodiment of the bypass element the two electrical conductors are pressed from both sides against the layer sequence. This can be achieved by a suitable resilient elements, such as spring elements, which are mounted in a correspondingly rigid holder and exert a corresponding force onto the electrical conductors from both sides. In the case of solid electrical conductors, it is also possible to provide these with a mechanical bias, as a result of which they are pressed against the layer sequence. To this end, the two conductors must each be fixed to a rigid support at a region arranged outside the region of contact with the layer sequence, such that the desired bias can be generated. Due to the pressure of the electrical conductors against the layer sequence, the electrical connection is produced more reliably once the exothermic reaction has been triggered. For example, it is thus possible to press out the insulation material from the gap between the electrical conductors merely as a result of liquification of the insulation layer and to thus already produce the electrical connection. Also in the case of one or more solderable layers being used in the layer sequence, a more reliable electrical soldered connection is produced between the electrical conductors as a result of the exerted pressure.

The materials of the reactive layer stack may be selected such that the layer stack is electrically conductive once the exothermic reaction has taken place. Alternatively, this layer stack may also be penetrated by through-openings, which then fill with solder material when an adjoining solder layer is used and thus produce the electrical connection through the layer stack.

The active layer stack has to be dimensioned or formed in terms of the selected layer materials and layer thicknesses as well as the number of layers such that sufficient thermal energy for the desired disintegration of the insulation layer(s) and possibly for the melting of the solder layer(s) are provided during the exothermic reaction, possibly in conjunction with one or more further reactive layer stacks. On the other hand, this layer stack also has to be dimensioned such that an undesired triggering of the exothermic reaction is prevented. Suitable dimensionings are known to a person skilled in the art from the prior art. The reactive layer stacks generally have between 100 and several thousands of thin layers with layer thicknesses in the range from 1 to 100 nm. The total thickness of a reactive layer stack may be between 10 μm and 1 mm for example.

Exemplary materials for the nanolayers of the layer stack include combinations of Ni and Cu or of Ni and Al. Other material combinations can of course also be used, which allow an exothermic reaction to be triggered. The insulation layer may consist of a wide range of insulating materials. Insulating varnishes, in particular photoresist or spraying varnishes, can be used particularly advantageously.

To trigger the reactive layer stack, said stack preferably protrudes laterally beyond the other layers on at least one side of the layer sequence. This layer stack can thus be easily electrically contacted for example in order to trigger the exothermic reaction locally as a result of a short current or voltage pulse. The reaction can be triggered in principle by different triggers, for example by a direct current/voltage pulse, a light pulse (for example of a laser diode) or a heat pulse (for example via an applied resistance path). With a plurality of reactive layer stacks, the reaction may also be triggered by an adjacent reactive layer stack. The amount of energy required in each case is provided from the composition of the reactive layer stack, in particular by the materials used and the thickness of the individual layers or plies. A composition of the reactive layer stack with one or more differently dimensioned regions is also possible. For example, the region of the reactive layer stack protruding beyond the other layers in the layer sequence can thus be dimensioned differently or a further reactive layer stack of different dimensioning can be applied to this region, as a result of which the exothermic reaction can be triggered more easily with an external energy input.

With the use of the proposed active bypass element in an energy storage device, which contains a plurality of storage cells connected in series, an electrical bypass element of this type is connected in parallel to each of the storage cells. In this case, the energy storage device preferably comprises a suitable measuring device, with which the imminent or recent failure of a storage cell can be detected, as well as a triggering device connected to the measuring device, said triggering device then triggering the bypass element connected in parallel to this storage cell by means of local energy input over the reactive layer stack of this bypass element. Suitable measuring devices for monitoring the storage cells are already provided in modern energy storage devices having a battery management system.

BRIEF DESCRIPTION OF THE DRAWINGS

The proposed bypass element will be explained again in greater detail hereinafter on the basis of exemplary embodiments in conjunction with the drawings, in which.

EMBODIMENTS OF THE INVENTION

Figure 1:
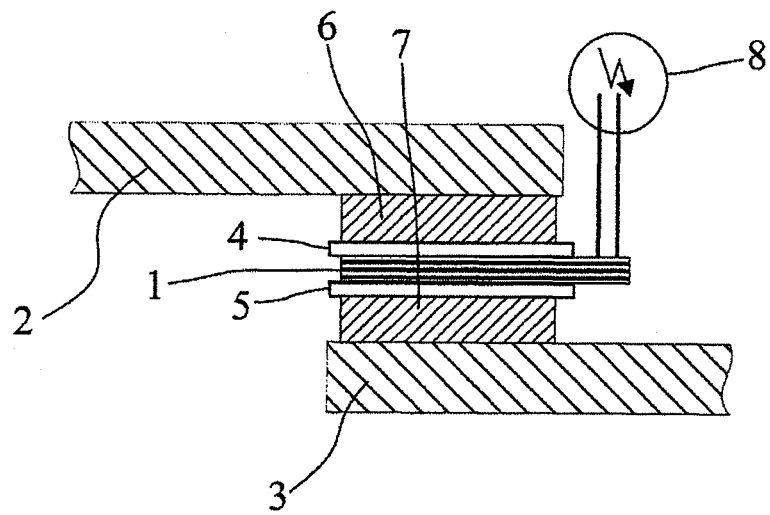
FIG. 1 shows a first example of an embodiment of the proposed bypass element.

Different possible embodiments of the proposed active bypass element will be illustrated schematically hereinafter in a cross-sectional view. The individual exemplary embodiments differ in terms of the composition of the layer sequence between the two busbars or busbar tracks 2, 3, which represent the two electrical conductors of the proposed bypass element in these examples. Of course, these electrical conductors may also be formed in another way. The two busbar tracks 2, 3, of each of which only a portion is illustrated in the figures, are connected to the two poles of the accumulator storage, cell to be bypassed by said conductors in the event of a failure.

For high-impedance insulation of the two busbars or busbar tracks, at least one electrical insulation layer 4, 5 is located between the busbar tracks, a portion of which is coated with a solderable layer 6, 7. In the example in FIG. 1, two electrical insulation layers 4, 5 of this type are arranged on either side of a reactive layer stack 1 between the busbar tracks 2, 3 in the layer sequence.

This active bypass element is triggered via a triggering device 8. For example, this may be a current or voltage source, a light source or also a heat source. In this case, the bypass element is triggered by a current or voltage pulse, by a light pulse or by a heat pulse, with which a region of the reactive layer stack 1 is activated or ignited in order to trigger an exothermic reaction in the reactive layer stack. This reaction results in a strong development of heat. As a result of this heat, the insulation layer 4, 5 is disintegrated. Due to the high development of heat, the two solder layers 6, 7 also melt. The insulator residues dissolve in the solder during this process. This results in an electrical contact between the two busbar tracks 2, 3, thus leading to an electrical bypass of the accumulator storage cell.

A layer sequence of this type can be produced for example with two solder layers formed from an Sn-containing solder with a layer thickness of approximately 30 to 50 μm, an insulating spraying varnish (for example Plastik70 by CRC Kontakt Chemie) applied with a thickness of approximately 1 to 5 μm and a commercially available reactive nanofoil (for example NanoFoil® NF60 by Indium Corporation) with a total thickness of the nanofoil of approximately 60 μm. To trigger the exothermic reaction, the region of the reactive layer stack 1 protruding from the layer sequence is connected via two wires to a battery, via which a short voltage pulse of approximately 9 to 12 V can be applied to the layer stack.

Figure 2:
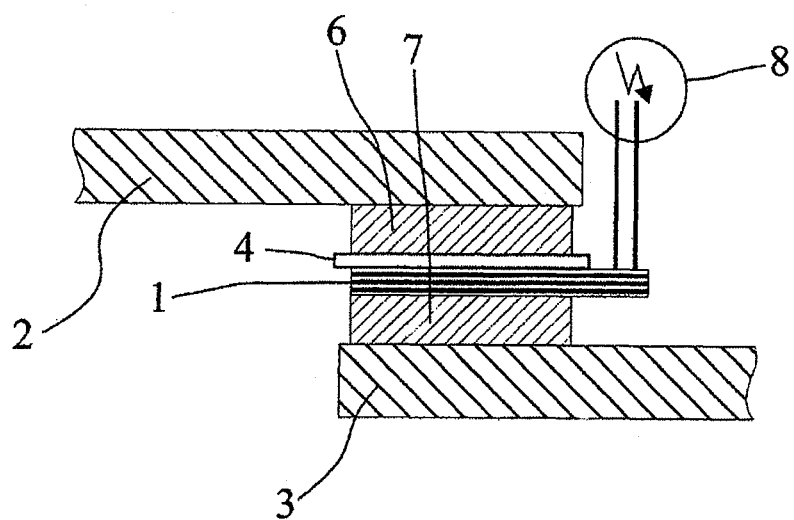
FIG. 2 shows a second example of an embodiment of the proposed bypass element.

FIG. 2 shows an example in which merely one electrical insulation layer 4 is arranged in the layer sequence. The thickness of the electrical insulation layer is selected so that it has the necessary dielectric strength between the two busbar tracks 2, 3. For the rest, the layer composition and the operating principle correspond to those in FIG. 1.

Figure 3:
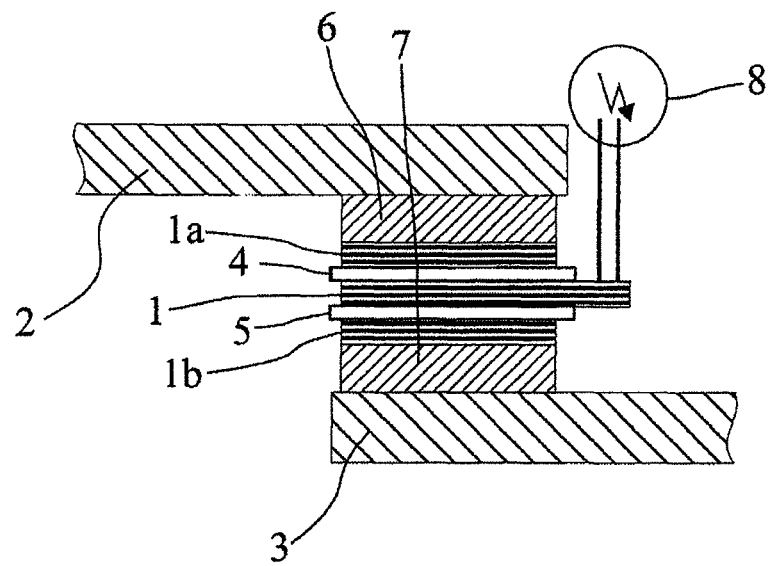
FIG. 3 shows a third example of an embodiment of the proposed bypass element.

FIG. 3 shows a further example, in which two further reactive layer stacks 1a, 1b are additionally arranged in the layer sequence compared to FIG. 1. These further layer stacks can be triggered in the first layer stack 1 by the exothermic reaction. An arrangement of this type allows the thermal energy produced by the exothermic reactions to act on the respective insulation layer 4, 5 from either side and to arrange the heat source closer to the solder layers 6 and 7.

Figure 4:
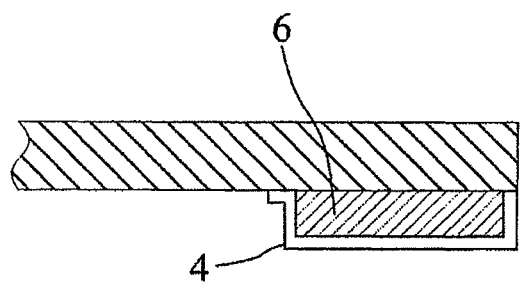
FIG. 4 shows an example of the application of the insulation layer.

FIG. 4 shows a detail of an example of the proposed bypass element, in which the electrically conductive insulating layer 4 completely covers the solder layer 6, as occurs for example when applying the insulation layer as a spraying varnish. In this case, the solder layer is first deposited on the busbar track 2 and the insulating spraying varnish is then sprayed on.

Figure 5:
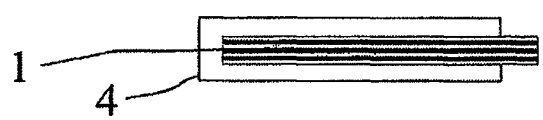
FIG. 5 shows a further example of the application of the insulation layer.

In another embodiment, the insulation layer 4, 5 may also be applied to both sides of a reactive nanofoil as the reactive layer stack 1, as is illustrated in detail in FIG. 5. For example, this may likewise be achieved by spraying an insulating spraying varnish or by dipping the nanofoil into a liquid insulation material, which then solidifies. The insulation layer may of course also only be applied to the nanofoil on one side. The nanofoil with the applied insulation layer is then applied to the respective solder layer.

The layer composition of the layer sequence can therefore be produced in different ways with the proposed bypass element, for example also by successive deposition of the individual layers by means of CVD (chemical vapour deposition) or PVD (physical vapour deposition).

Figure 6:
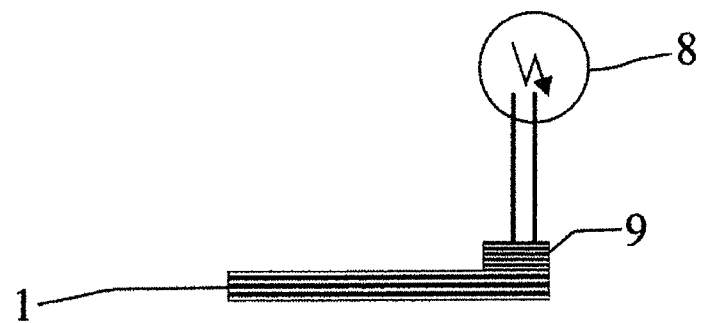
FIG. 6 shows an example of a composition of the reactive layer stack for improving ignitability.

FIG. 6 shows an example in which a further reactive layer stack 9—which can be ignited with low energy input—is applied to the portion of the reactive layer stack 1 protruding from the layer sequence. The conditions in the layer sequence can thus be adjusted by suitable dimensioning of the reactive layer stacks 1 and 9 such that the energy required for triggering and the energy released by the exothermic reaction within the layer sequence can be dimensioned separately from one another. The required amount of energy in each case is given from the composition of the reactive layer stack, in particular the materials thereof and the thickness of the individual layers or plies.

Figure 7:
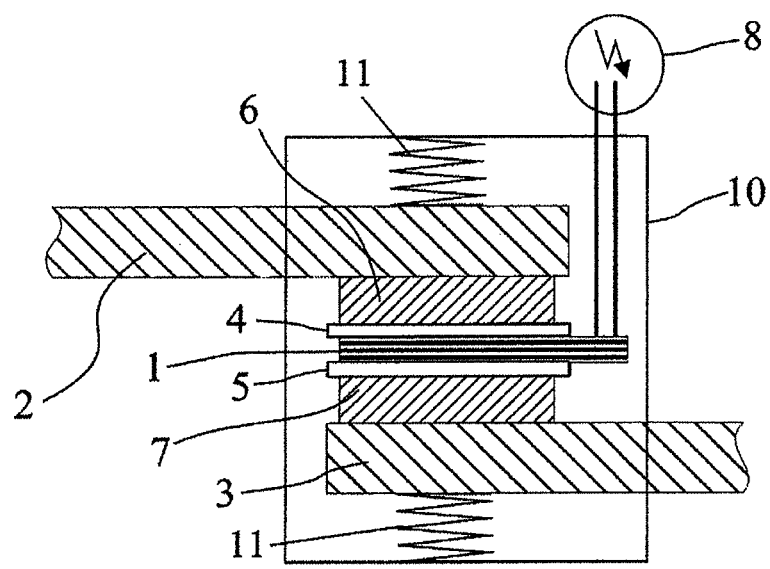
FIG. 7 shows a fourth example of an embodiment of the proposed bypass element.

In addition, the formation of the electrical connection between the two busbar tracks 2, 3 can be improved as a result of external pressure on the two busbar tracks. To this end, an example is illustrated in FIG. 7, in which the two busbar tracks 2, 3 are pressed against the layer sequence via two resilient elements 11 mounted in a rigid holder 10. As a result of this mechanical bias, a sufficient mechanical pressure can be exerted onto the two connection partners during the exothermic reaction and leads to an improved electrically conductive connection. In particular, this is also advantageous in conjunction with the solder layers 6, 7. If the exothermic reaction is of such a magnitude that the two solder layers melt completely at least in individual regions, a reliable soldered connection is produced between the two busbar tracks in conjunction with the exerted pressure.

Figure 8:
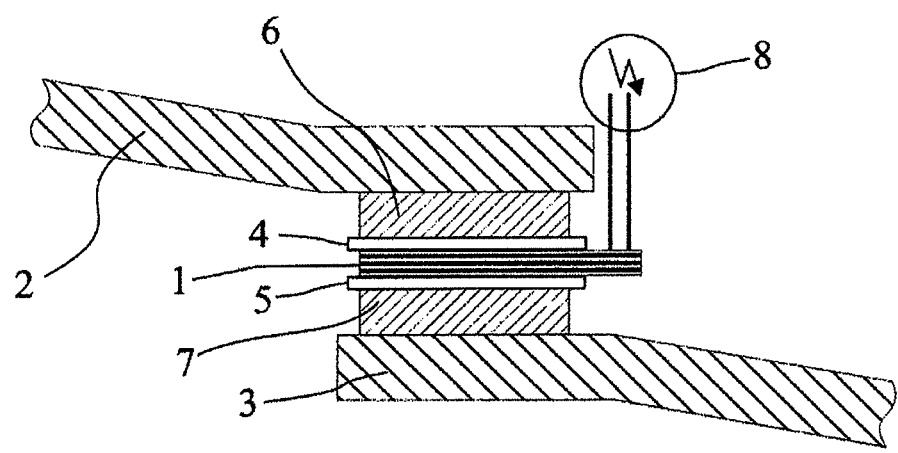
FIG. 8 shows a fifth example of an embodiment of the proposed bypass element.

Another possibility for generating a mechanical bias is illustrated schematically in FIG. 8. In this case, the two busbar tracks 2, 3 are securely fixed to a rigid support (not illustrated in the figure) in a portion outside the region of contact with the layer sequence and are braced or strained against one another (indicated by the deflection in FIG. 8) such that they press against the layer sequence arranged therebetween.

The proposed active bypass element functions as an irreversible active inverse safety device when it is connected parallel to the individual storage cells in an energy storage device. It has a simple, cost-effective and reliable design. For triggering, merely a short-term low-energy ignition pulse (activation energy) has to be applied to a region of the reactive layer stack. The majority of the energy leading to the short circuit is already provided in the form of chemical energy in the reactive layer stack and the mechanical bias possibly present. The proposed active bypass element can be triggered early with suitable monitoring of the storage cells, without having to wait for a failure of individual accumulator cells.

It will be understood that the above description of the present invention is susceptible to various modifications, changes and adaptations, and the same are intended to be comprehended within the meaning and range of equivalents of the appended claims

The invention claimed is:
1. An electrical bypass element comprising:
   two electrical conductors;
   a layer sequence arranged between the two electrical conductors, said layer sequence comprising at least one electrical insulation layer which insulates the two electrical conductors electrically from one another, and one or more reactive layer stacks, the one or more reactive layer stacks comprising reactive nanofoils, the reactive nanofoils including alternating nanolayers of different materials;
   wherein the alternating nanolayers are triggerable to react exothermically with one another in an exothermic reaction; and
   wherein the one or more reactive layer stacks and the at least one insulation layer are matched to one another such that the insulation layer disintegrates as a result of thermal energy released by the one or more reactive layer stacks during the exothermic reaction to establish an electrical connection between the electrical conductors.
2. The bypass element according to claim 1, wherein the layer sequence comprises a layer formed from a solder material at one or both electrical conductors, which solder material melts at least in part as a result of the thermal energy released by the reactive layer stack(s) during the exothermic reaction.

3. The bypass element according to claim 1, wherein the layer sequence comprises at least the following layers in the specified order between the electrical conductors:
   a first layer formed from a solder material,
   the electrical insulation layer,
   the reactive layer stack,
   a further electrical insulation layer, and
   a second layer formed from a solder material.

4. The bypass element according to claim 3, wherein a further reactive layer stack is arranged in each case between the first layer formed from the solder material and the insulation layer and/or between the second layer formed from the solder material and the further insulation layer.

5. The bypass element according to claim 1, wherein the two electrical conductors with the layer sequence arranged therebetween are fixed in a rigid holder by means of resilient elements such that the electrical conductors are pressed against the layer sequence by the resilient elements.

6. The bypass element according to claim 1, wherein the two electrical conductors are fixed to a rigid support via a portion distanced from the layer sequence and are under mechanical bias, as a result of which they are pressed against the layer sequence.

7. The bypass element according to claim 1, wherein at least one of the one or more reactive layer stacks protrudes beyond the other layers in the layer sequence at least on one side.

8. The bypass element according to claim 7, wherein the at least one reactive layer stack has a layer composition in a region protruding beyond the other layers in the layer sequence, said layer composition enabling the exothermic reaction to be triggered with a lower energy input than the layer composition in other regions of the reactive layer stack.

9. An energy storage device comprising a plurality of storage cells connected in series, in which an electrical bypass element according to claim 1 is connected in parallel to each of the storage cells.

10. The energy storage device according to claim 9, which comprises a measuring device for detecting an imminent failure of a storage cell and a triggering device connected to the measuring device, said triggering device triggering an exothermic reaction in the reactive layer stack upon detection of an imminent failure by means of a local application of energy over the reactive layer stack of the bypass element connected in parallel to the failing storage cell.

* * * * *